(12) United States Patent
Swoboda et al.

(10) Patent No.: US 7,310,749 B2
(45) Date of Patent: Dec. 18, 2007

(54) APPARATUS AND METHOD FOR TRACE STREAM IDENTIFICATION OF A PROCESSOR DEBUG HALT SIGNAL

(75) Inventors: Gary L. Swoboda, Sugar Land, TX (US); Bryan Thome, Missouri City, TX (US); Lewis Nardini, Dallas, TX (US); Manisha Agarwala, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 648 days.

(21) Appl. No.: 10/729,214

(22) Filed: Dec. 5, 2003

(65) Prior Publication Data

US 2004/0117770 A1   Jun. 17, 2004

Related U.S. Application Data

(60) Provisional application No. 60/434,122, filed on Dec. 17, 2002.

(51) Int. Cl.
    *G06F 11/00* (2006.01)
(52) U.S. Cl. .................... 714/45; 714/30; 714/34; 717/124
(58) Field of Classification Search .................. 714/45, 714/34, 39, 30; 717/128
    See application file for complete search history.

(56) References Cited

U.S. PATENT DOCUMENTS 5,771,240 A * 6/1998 Tobin et al. ................ 714/724
6,463,551 B1 * 10/2002 Kanzaki et al. .............. 714/30
6,912,675 B2 * 6/2005 Swoboda ..................... 714/45
6,961,872 B2 * 11/2005 Yamamoto et al. .......... 714/34

* cited by examiner

*Primary Examiner*—Yolanda L. Wilson
(74) *Attorney, Agent, or Firm*—William W. Holloway; W. James Brady; Frederick J. Telecky, Jr.

(57) ABSTRACT

When a DEBUG HALT signal is generated in a target processor during a test procedure, a debug halt sync marker is generated in a program counter trace stream. The debug halt sync marker includes a plurality of packets, the packets identifying that the sync marker is the result of a DEBUG HALT signal. The packets also identify the program counter address at the time of the generation of the DEBUG HALT signal and relate the debug halt sync marker to a timing trace stream.

9 Claims, 6 Drawing Sheets

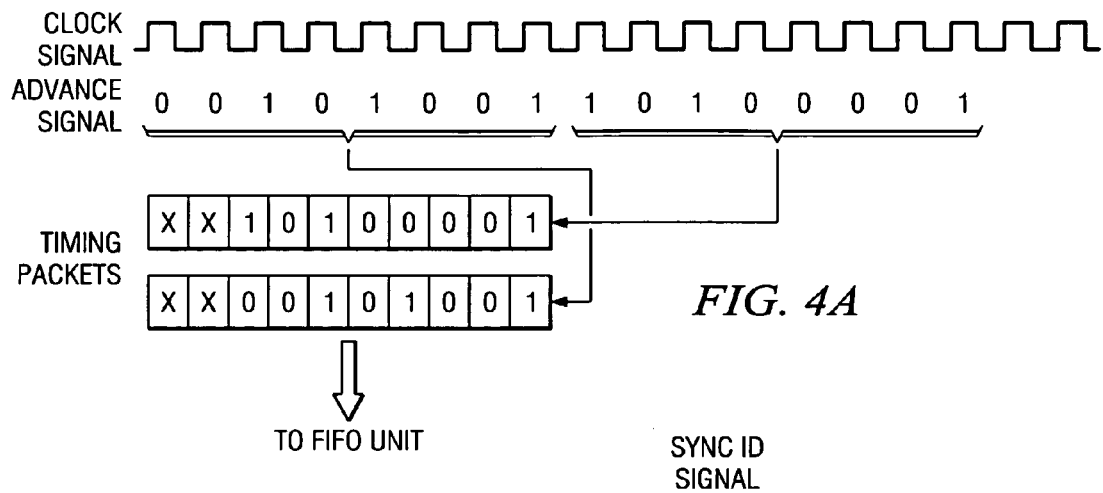

*FIG. 4A*

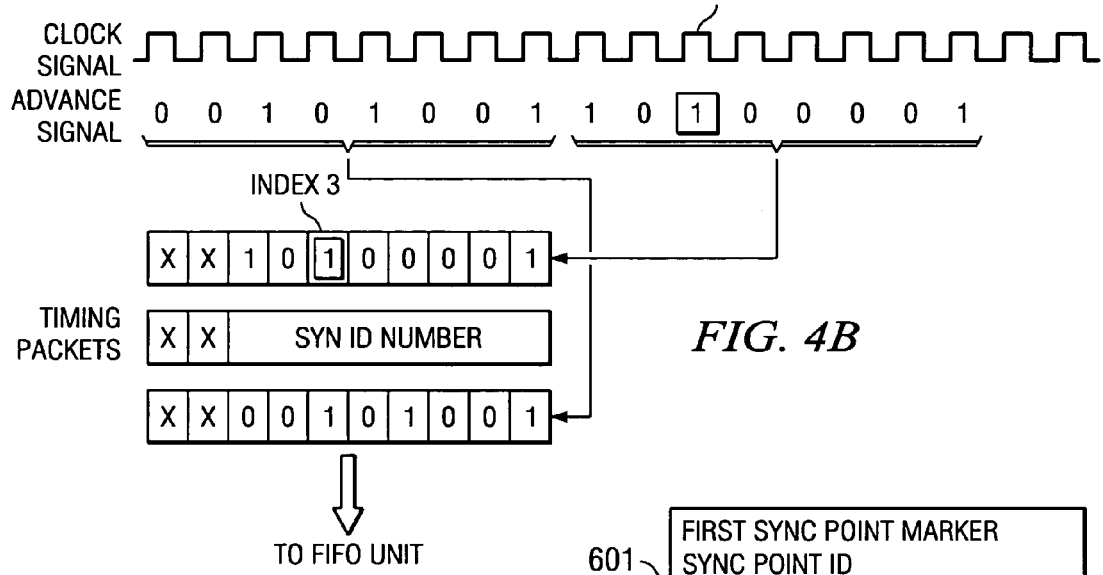

*FIG. 4B*

SYNC POINT TYPE
TYPE FAMILY
BRANCH INDEX
SYNC POINT ID
TIMING INDEX
TYPE DATA
ABSOLUTE PROGRAM
 COUNTER ADDRESS
PROGRAM COUNTER
 OFFSET ADDRESS

*FIG. 5*

601 — FIRST SYNC POINT MARKER
SYNC POINT ID
TIMING INDEX
ABSOLUTE PC VALUE

○
○
○

602 — PERIODIC SYNC POINT ID MARKER
SYNC POINT ID
TIMING INDEX
ABSOLUTE PC VALUE

○
○
○

603 — LAST SYNC POINT MARKER
SYNC POINT ID
TIMING INDEX
ABSOLUTE PC VALUE

*FIG. 6A*

APPARATUS AND METHOD FOR TRACE STREAM IDENTIFICATION OF A PROCESSOR DEBUG HALT SIGNAL

This application claims priority under 35 USC §119(e) (1) of Provisional application No. 60/434,122 filed Dec. 17, 2002.

RELATED APPLICATIONS

U.S. patent application Ser. No. 10/728,627, entitled APPARATUS AND METHOD FOR SYNCHRONIZATION OF TRACE STREAMS FROM MULTIPLE PROCESSING UNITS, invented by Gary L. Swoboda, filed on even date herewith, and assigned to the assignee of the present application; U.S. patent application Ser. No. 10/729,212, entitled APPARATUS AND METHOD FOR SEPARATING DETECTION AND ASSERTION OF A TRIGGER EVENT, invented by Gary L. Swoboda, filed on even date herewith, and assigned to the assignee of the present application; U.S. patent application Ser. No. 10/729,239, entitled APPARATUS AND METHOD FOR STATE SELECTABLE TRACE STREAM GENERATION, invented by Gary L. Swoboda, filed on even date herewith, and assigned to the assignee of the present application; U.S. patent application Ser. No. 10/729,650, entitled APPARATUS AND METHOD FOR SELECTING PROGRAM HALTS IN AN UNPROTECTED PIPELINE AT NON-INTERRUPTIBLE POINTS IN CODE EXECUTION, invented by Gary L. Swoboda, filed on even date herewith, and assigned to the assignee of the present application; U.S. patent application Ser. No. 10/729,591, entitled APPARATUS AND METHOD FOR REPORTING PROGRAM HALTS IN AN UNPROTECTED PIPELINE AT NON-INTERRUPTIBLE POINTS IN CODE EXECUTION, invented by Gary L. Swoboda, filed on even date herewith, and assigned to the assignee of the present application; U.S. patent application Ser. No. 10/729,407, entitled APPARATUS AND METHOD FOR A FLUSH PROCEDURE IN AN INTERRUPTED TRACE STREAM, invented by Gary L. Swoboda, filed on even date herewith, and assigned to the assignee of the present application; U.S. patent application Ser. No. 10/729,564, entitled APPARATUS AND METHOD FOR CAPTURING AN EVENT OR COMBINATION OF EVENTS RESULTING IN A TRIGGER SIGNAL IN A TARGET PROCESSOR, invented by Gary L. Swoboda, filed on even date herewith, and assigned to the assignee of the present application; U.S. patent application Ser. No. 10/729,400, entitled APPARATUS AND METHOD FOR CAPTURING THE PROGRAM COUNTER ADDRESS ASSOCIATED WITH A TRIGGER SIGNAL IN A TARGET PROCESSOR, invented by Gary L. Swoboda, filed on even date herewith, and assigned to the assignee of the present application; U.S. patent application Ser. No. 10/729,592, entitled APPARATUS AND METHOD DETECTING ADDRESS CHARACTERISTICS FOR USE WITH A TRIGGER GENERATION UNIT IN A TARGET PROCESSOR, invented by Gary L. Swoboda and Jason L. Peck, filed on even date herewith, and assigned to the assignee of the present application U.S. patent application Ser. No. 10/729,639, entitled APPARATUS AND METHOD FOR TRACE STREAM IDENTIFICATION OF A PROCESSOR RESET, invented by Gary L. Swoboda and Bryan Thome, filed on even date herewith, and assigned to the assignee of the present application; U.S. patent application Ser. No. 10/729,327, entitled APPARATUS AND METHOD FOR TRACE STREAM IDENTIFICATION OF A PIPELINE FLATTENER PRIMARY CODE FLUSH FOLLOWING INITIATION OF AN INTERRUPT SERVICE ROUTINE; invented by Gary L. Swoboda and Bryan Thome, filed on even date herewith, and assigned to the assignee of the present application; U.S. patent application Ser. No. 10/729,647, entitled APPARATUS AND METHOD FOR TRACE STREAM IDENTIFICATION OF A PIPELINE FLATTENER SECONDARY CODE FLUSH FOLLOWING A RETURN TO PRIMARY CODE EXECUTION, invented by Gary L. Swoboda and Bryan Thome, filed on even date herewith, and assigned to the assignee of the present application; U.S. patent application Ser. No. 10/729,401, entitled APPARATUS AND METHOD IDENTIFICATION OF A PRIMARY CODE START SYNC POINT FOLLOWING A RETURN TO PRIMARY CODE EXECUTION, invented by Gary L. Swoboda, filed on even date herewith, and assigned to the assignee of the present application; U.S. patent application Ser. No. 10/729,326, entitled APPARATUS AND METHOD FOR IDENTIFICATION OF A NEW SECONDARY CODE START POINT FOLLOWING A RETURN FROM A SECONDARY CODE EXECUTION, invented by Gary L. Swoboda, filed on even date herewith, and assigned to the assignee of the present application; U.S. patent application Ser. No. 10/729,190, entitled APPARATUS AND METHOD FOR TRACE STREAM IDENTIFICATION OF A PAUSE POINT IN A CODE EXECTION SEQUENCE, invented by Gary L. Swoboda, filed on even date herewith, and assigned to the assignee of the present application; U.S. patent application Ser. No. 10/729,196, entitled APPARATUS AND METHOD FOR COMPRESSION OF A TIMING TRACE STREAM, invented by Gary L. Swoboda and Bryan Thome, filed on even date herewith, and assigned to the assignee of the present application; U.S. patent application Ser. No. 10/729,272, entitled APPARATUS AND METHOD FOR TRACE STREAM IDENTIFICATION OF MULTIPLE TARGET PROCESSOR EVENTS, invented by Gary L. Swoboda and Bryan Thome, filed on even date herewith, and assigned to the assignee of the present application; and U.S. patent application Ser. No. 10/729,191, entitled APPARATUS AND METHOD FOR OP CODE EXTENSION IN PACKET GROUPS TRANSMITTED IN TRACE STREAMS, invented by Gary L. Swoboda and Bryan Thome, filed on even date herewith, and assigned to the assignee of the present application are related applications.

BACKGROUND OF THE INVENTION

1. Field of the Invention

This invention relates generally to the testing of digital signal processing units and, more particularly, to the signals that are transmitted from a target processor to a host processing to permit analysis of the target processor operation. Certain events in the target processor must be communicated to the host processing unit along with contextual information. In this manner, the test and debug data can be analyzed and problems in the operation of the target processor identified.

2. Description of the Related Art

As microprocessors and digital signal processors have become increasingly complex, advanced techniques have been developed to test these devices. Dedicated apparatus is available to implement the advanced techniques. Referring to FIG. 1A, a general configuration for the test and debug of a target processor 12 is shown. The test and debug procedures operate under control of a host processing unit 10. The host processing unit 10 applies control signals to the emulation unit 11 and receives (test) data signals from the emulation unit 11 by cable connector 14. The emulation unit 11 applies control signals to and receives (test) signals from the target processing unit 12 by connector cable 15. The emulation unit 11 can be thought of as an interface unit between the host processing unit 10 and the target processor 12. The emulation unit 11 processes the control signals from the host processor unit 10 and applies these signals to the target processor. 12 in such a manner that the target processor will respond with the appropriate test signals. The test signals from the target processor 12 can be a variety types. Two of the most popular test signal types are the JTAG (Joint Test Action Group) signals and trace signals. The JTAG protocol provides a standardized test procedure in wide use in which the status of selected components is determined in response to control signals from the host processing unit. Trace signals are signals from a multiplicity of selected locations in the target processor 12 during defined period of operation. While the width of the bus 15 interfacing to the host processing unit 10 generally has a standardized dimension, the bus between the emulation unit 11 and the target processor 12 can be increased to accommodate an increasing amount of data needed to verify the operation of the target processing unit 12. Part of the interface function between the host processing unit 10 and the target processor 12 is to store the test signals until the signals can be transmitted to the host processing unit 10.

Referring to FIG. 1B, the operation of the trigger generation unit 19 is shown. The trigger unit provides the main component by which the operation/state of the target processor can be altered. At least one event signal is applied to the trigger generation unit 19. Based on the identity of the event signal(s) applied to the trigger generation unit 19, a trigger signal is selected. Certain events and combination of events, referred to as an event front, generate a selected trigger signal that results in certain activity in the target processor such as a debug halt. Combinations of different events generating trigger signals are referred to as jobs. Multiple jobs can have the same trigger signal or combination of trigger signals. In the test and debug of the target processor, the trigger signals can provide impetus for changing state in the target processor or for performing a specified activity. The event front defines the reason for the generation of trigger signal. This information is important in understanding the operation of the target processor because, as pointed out above, several combinations of events can result in the generation of a trigger signal.

In order to analyze the operation of the target processing unit, the portion of the code resulting in the trigger signal must be identified. However, the events in the host processor leading to the generation of event signals can be complicated. Specifically, the characteristics of an instruction at a program counter address can determine whether a trigger signal should be generated. A trigger signal can be an indication of when an address is within a range of addresses, outside of a range of addresses, some combination of address characteristics, and/or the address is aligned with a reference address. In this instance, the address can be the program address of an instruction or a memory address directly or indirectly referenced by a program instruction.

In testing the target processors, certain events must be identified. The debug halt signal is generated when specified conditions within the target processor indicates that an event has occurred that requires analysis of the target processor operation. However, it is important to determine the point in the processing procedure where the debug halt condition signal was generated. In additions, the relationship of the debug halt signal to the target processor clock, to the program execution, and to the data generated as a result of the program execution can be needed by the host processing unit to determine the origin of the debug halt.

A need has been felt for apparatus and an associated method having the feature that a debug halt signal is identified in a target processor and generation of the debug halt signal is communicated to the testing apparatus. It is another feature of the apparatus and associated method to transfer information concerning the generation of the debug halt procedure the testing processing unit using a trace stream. It is a still further feature of the apparatus and associated method to communicate to the testing apparatus where the debug halt signal is initiated during the program execution. It is yet another feature of the present in invention to communicate to the testing processing unit the relationship of the generation of the debug halt signal to the target processor clock.

SUMMARY OF THE INVENTION

The aforementioned and other features are accomplished, according to the present invention, by providing the target processor with at least two trace streams. One of the trace streams is a timing trace stream. The second trace stream, when a debug halt signal generated, is provided with a sync marker. The sync marker includes at least one portion identifying the event as a debug halt signal, a portion relating the debug halt signal to the processor clock, and a portion identifying the point in the program execution when the debug halt signal is generated. In the preferred embodiment, the second trace stream is a program counter trace stream. The point in the program execution where the debug halt signal is generated is determined by the program counter address. The time of the occurrence of the reset procedure is determined by periodic trace synchronization markers relating the timing trace stream and the program counter trace stream. These trace streams can specify the clock cycle and the point in the program at which the debug halt signal was generated.

Other features and advantages of present invention will be more clearly understood upon reading of the following description and the accompanying drawings and the claims.

BRIEF DESCRIPTION OF THE DRAWINGS

FIG. 1A is a general block diagram of a system configuration for test and debug of a target processor, while

FIG. 4A illustrates format by which the timing packets are assembled according to the present invention, while FIG. 4B illustrates the incorporation of the periodic synchronization marker in the timing trace stream according to the present invention.

FIG. 5 illustrates the parameters for sync markers in the program counter stream packets according to the present invention.

FIG. 6A illustrates the sync markers in the program counter trace stream when a periodic sync point ID signal is generated, while

FIG. 7A is a block diagram illustrating the apparatus used in reconstructing the processor operation from the trace streams according to the present invention, while

DESCRIPTION OF THE PREFERRED EMBODIMENT

1. Detailed Description of the Figures

Figure 1A:
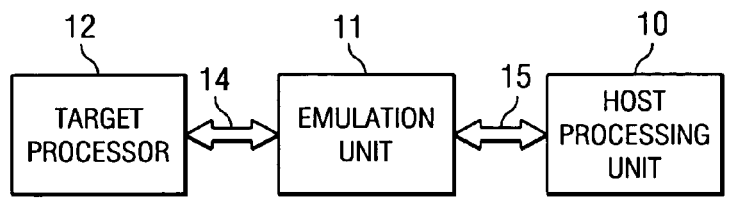
Figure 1B:
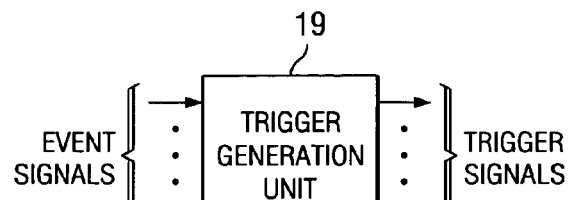
FIG. 1B illustrates the function of the trigger unit in the target processing unit.

FIG. 1A and FIG. 1B have been described with respect to the related art.

Figure 2:
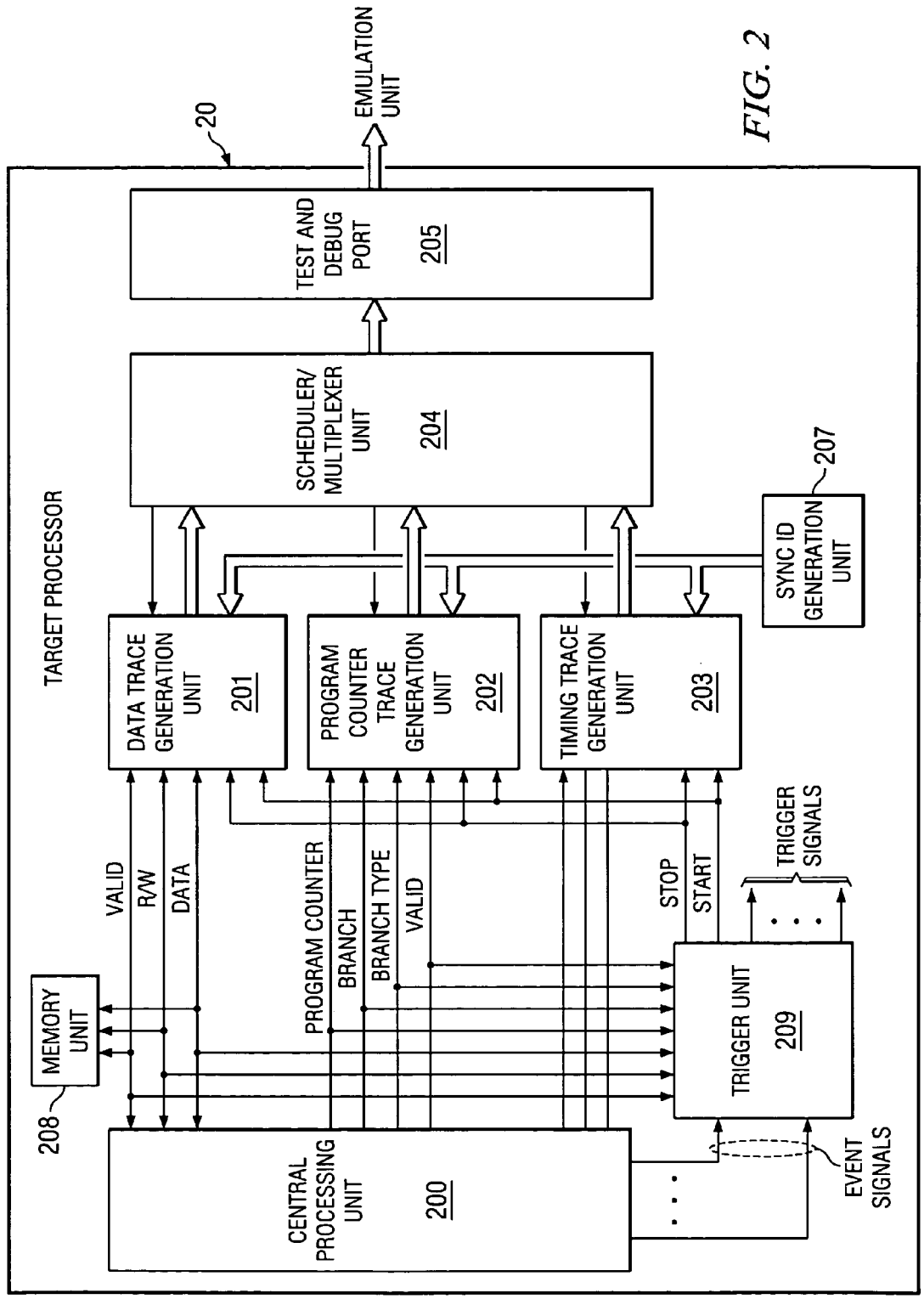
FIG. 2 is a block diagram of selected components in the target processor used the testing of the central processing unit of the target processor according to the present invention.

Referring to FIG. 2, a block diagram of selected components of a target processor 20, according to the present invention, is shown. The target processor includes at least one central processing unit 200 and a memory unit 208. The central processing unit 200 and the memory unit 208 are the components being tested. The trace system for testing the central processing unit 200 and the memory unit 202 includes three packet generating units, a data packet generation unit 201, a program counter packet generation unit 202 and a timing packet generation unit 203. The data packet generation unit 201 receives VALID signals, READ/WRITE signals and DATA signals from the central processing unit 200. After placing the signals in packets, the packets are applied to the scheduler/multiplexer unit 204 and forwarded to the test and debug port 205 for transfer to the emulation unit 11. The program counter packet generation unit 202 receives PROGRAM COUNTER signals, VALID signals, BRANCH signals, and BRANCH TYPE signals from the central processing unit 200 and, after forming these signal into packets, applies the resulting program counter packets to the scheduler/multiplexer 204 for transfer to the test and debug port 205. The timing packet generation unit 203 receives ADVANCE signals, VALID signals and CLOCK signals from the central processing unit 200 and, after forming these signal into packets, applies the resulting packets to the scheduler/multiplexer unit 204 and the scheduler/multiplexer 204 applies the packets to the test and debug port 205. Trigger unit 209 receives EVENT signals from the central processing unit 200 and signals that are applied to the data trace generation unit 201, the program counter trace generation unit 202, and the timing trace generation unit 203. The trigger unit 209 applies TRIGGER and CONTROL signals to the central processing unit 200 and applies CONTROL (i.e., STOP and START) signals to the data trace generation unit 201, the program counter generation unit 202, and the timing trace generation unit 203. The sync ID generation unit 207 applies signals to the data trace generation unit 201, the program counter trace generation unit 202 and the timing trace generation unit 203. While the test and debug apparatus components are shown as being separate from the central processing unit 201, it will be clear that an implementation these components can be integrated with the components of the central processing unit 201.

Figure 3:
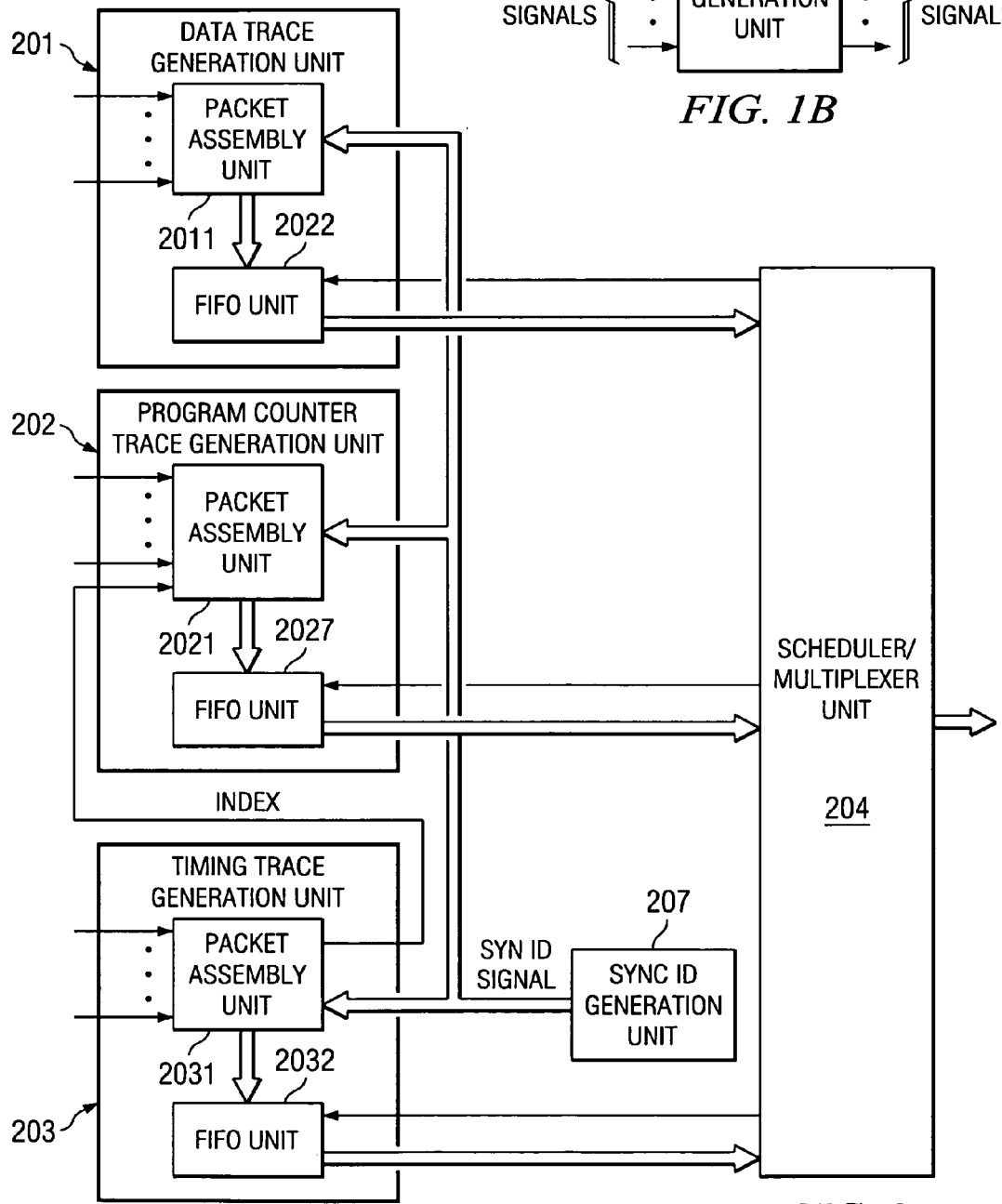
FIG. 3 is a block diagram of selected components of the illustrating the relationship between the components transmitting trace streams in the target processor.

Referring to FIG. 3, the relationship between selected components in the target processor 20 is illustrated. The data trace generation unit 201 includes a packet assembly unit 2011 and a FIFO (first in/first out) storage unit 2012, the program counter trace generation unit 202 includes a packet assembly unit 2021 and a FIFO storage unit 2022, and the timing trace generation unit 203 includes a packet generation unit 2031 and a FIFO storage unit 2032. As the signals are applied to the packet generators 201, 202, and 203, the signals are assembled into packets of information. The packets in the preferred embodiment are 10 bits in width. Packets are assembled in the packet assembly units in response to input signals and transferred to the associated FIFO unit. The scheduler/multiplexer 204 generates a signal to a selected trace generation unit and the contents of the associated FIFO storage unit are transferred to the scheduler/multiplexer 204 for transfer to the emulation unit. Also illustrated in FIG. 3 is the sync ID generation unit 207. The sync ID generation unit 207 applies an SYNC ID signal to the packet assembly unit of each trace generation unit. The periodic signal, a counter signal in the preferred embodiment, is included in a current packet and transferred to the associated FIFO unit. The packet resulting from the SYNC ID signal in each trace is transferred to the emulation unit and then to the host processing unit. In the host processing unit, the same count in each trace stream indicates that the point at which the trace streams are synchronized. In addition, the packet assembly unit 2031 of the timing trace generation unit 203 applies and INDEX signal to the packet assembly unit 2021 of the program counter trace generation unit 202. The function of the INDEX signal will be described below.

Referring to FIG. 4A, the assembly of timing packets is illustrated. The signals applied to the timing trace generation unit 203 are the CLOCK signals and the ADVANCE signals. The CLOCK signals are system clock signals to which the operation of the central processing unit 200 is synchronized. The ADVANCE signals indicate an activity such as a pipeline advance or program counter advance (( )) or a pipeline non-advance or program counter non-advance (1). An ADVANCE or NON-ADVANCE signal occurs each clock cycle. The timing packet is assembled so that the logic signal indicating ADVANCE or NON-ADVANCE is transmitted at the position of the concurrent CLOCK signal. These combined CLOCK/ADVANCE signals are divided into groups of 8 signals, assembled with two control bits in the packet assembly unit 2031, and transferred to the FIFO storage unit 2032.

Referring to FIG. 4B, the trace stream generated by the timing trace generation unit 203 is illustrated. The first (in time) trace packet is generated as before. During the assembly of the second trace packet, a SYYN ID signal is generated during the third clock cycle. In response, the timing packet assembly unit 2031 assembles a packet in response to the SYNC ID signal that includes the sync ID number. The next timing packet is only partially assembled at the time of the SYNC ID signal. In fact, the SYNC ID signal occurs during the third clock cycle of the formation of this timing packet. The timing packet assembly unit 2031 generates a TIMING INDEX 3 signal (for the third packet clock cycle at which the SYNC ID signal occurs) and transmits this TIMING INDEX 3 signal to the program counter packet assembly unit 2031.

Referring to FIG. 5, the parameters of a sync marker in the program counter trace stream, according to the present invention is shown. The program counter stream sync markers each have a plurality of packets associated therewith. The packets of each sync marker can transmit a plurality of parameters. A SYNC POINT TYPE parameter defines the event described by the contents of the accompanying packets. A program counter TYPE FAMILY parameter provides a context for the SYNC POINT TYPE parameter and is described by the first two most significant bits of a second header packet. A BRANCH INDEX parameter in all but the final SYNC POINT points to a bit within the next relative branch packet following the SYNC POINT. When the program counter trace stream is disabled, this index points a bit in the previous relative branch packet when the BRANCH INDEX parameter is not a logic "0". In this situation, the branch register will not be complete and will be considered as flushed. When the BRANCH INDEX is a logic "0", this value point to the least significant value of branch register and is the oldest branch in the packet. A SYNC ID parameter matches the SYNC POINT with the corresponding TIMING and/or DATA SYNC POINT which are tagged with the same SYNC ID parameter. A TIMING INDEX parameter is applied relative to a corresponding TIMING SYNC POINT. For all but LAST POINT SYNC events, the first timing packet after the TIMING PACKET contains timing bits during which the SYNC POINT occurred. When the timing stream is disabled, the TIMING INDEX points to a bit in the timing packet just previous to the TIMING SYNC POINT packet when the TIMING INDEX value is nor zero. In this situation, the timing packet is considered as flushed. A TYPE DATA parameter is defined by each SYNC TYPE. An ABSOLUTE PC VALUE is the program counter address at which the program counter trace stream and the timing information are aligned. An OFFSET COUNT parameter is the program counter offset counter at which the program counter and the timing information are aligned.

Referring to FIG. 6A, a program counter trace stream for a hypothetical program execution is illustrated. In this program example, the execution proceeds without interruption from external events. The program counter trace stream will consist of a first sync point marker 601, a plurality of periodic sync point ID markers 602, and last sync point marker 603 designating the end of the test procedure. The principal parameters of each of the packets are a sync point type, a sync point ID, a timing index, and an absolute PC value. The first and last sync points identify the beginning and the end of the trace stream. The sync ID parameter is the value from the value from the most recent sync point ID generator unit. In the preferred embodiment, this value in a 3-bit logic sequence. The timing index identifies the status of the clock signals in a packet, i.e., the position in the 8 position timing packet when the event producing the sync signal occurs. And the absolute address of the program counter at the time that the event causing the sync packet is provided. Based on this information, the events in the target processor can be reconstructed by the host processor.

Figure 6B:
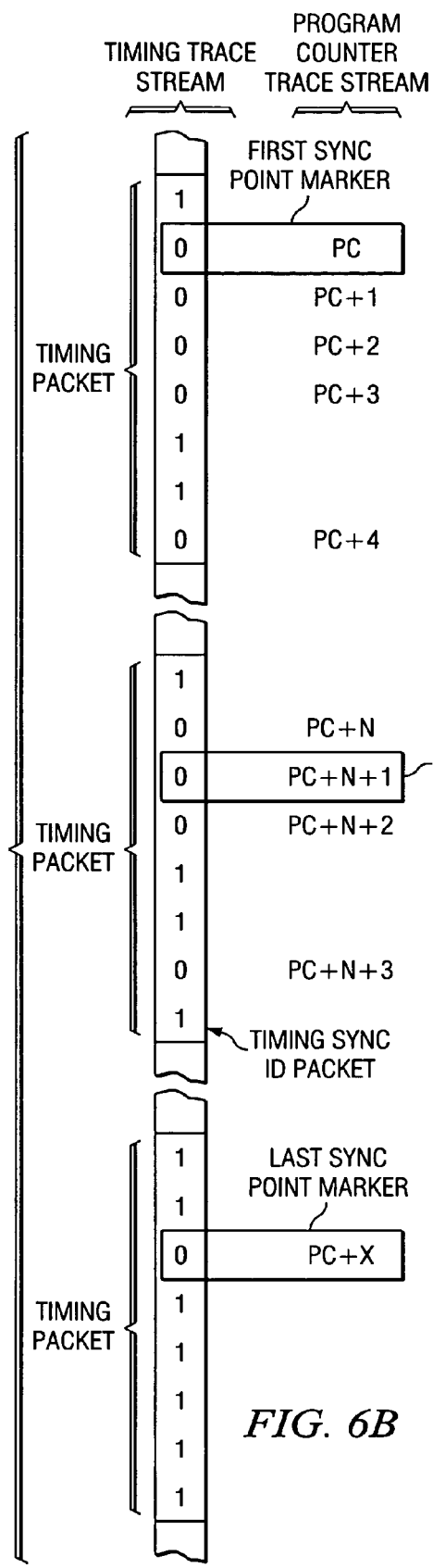
FIG. 6B illustrates the reconstruction of the target processor operation from the trace streams according to the present invention.

Referring to FIG. 6B, the reconstruction of the program execution from the timing and program counter trace streams is illustrated. The timing trace stream consists of packets of 8 logic "0"s and logic "1"s. The logic "0"s indicate that either the program counter or the pipeline is advanced, while the logic "1"s indicate the either the program counter or the pipeline is stalled during that clock cycle. Because each program counter trace packet has an absolute address parameter, a sync ID, and the timing index in addition to the packet identifying parameter, the program counter addresses can be identified with a particular clock cycle. Similarly, the periodic sync points can be specifically identified with a clock cycle in the timing trace stream. In this illustration, the timing trace stream and the sync ID generating unit are in operation when the program counter trace stream is initiated. The periodic sync point is illustrative of the plurality of periodic sync points that would typically be available between the first and the last trace point, the periodic sync points permitting the synchronization of the three trace streams for a processing unit.

Figure 7A:
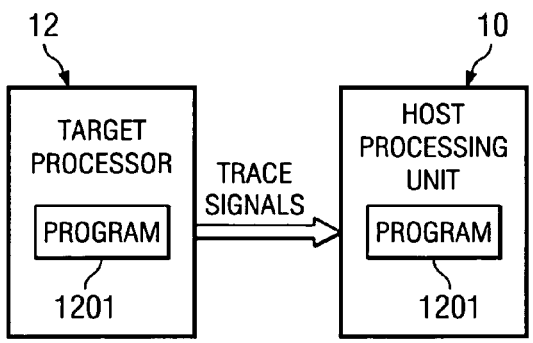

Referring to FIG. 7A, the general technique for reconstruction of the trace streams is illustrated. The trace streams originate in the target processor 12 as the target processor 12 is executing a program 1201. The trace signals are applied to the host processing unit 10. The host processing unit 10 also includes the same program 1201. Therefore, in the illustrative example of FIG. 6 wherein the program execution proceeds without interruptions or changes, only the first and the final absolute addresses of the program counter are needed. Using the advance/non-advance signals of the timing trace stream, the host processing unit can reconstruct the program as a function of clock cycle. Therefore, without the sync ID packets, only the first and last sync markers are needed for the trace stream. This technique results in reduced information transfer. FIG. 6 includes the presence of periodic sync ID cycles, of which only one is shown. The periodic sync ID packets are important for synchronizing the plurality of trace streams, for selection of a particular portion of the program to analyze, and for restarting a program execution analysis for a situation wherein at least a portion of the data in the trace data stream is lost. The host processor can discard the (incomplete) trace data information between two sync ID packets and proceed with the analysis of the program outside of the sync timing packets defining the lost data.

Figure 7B:
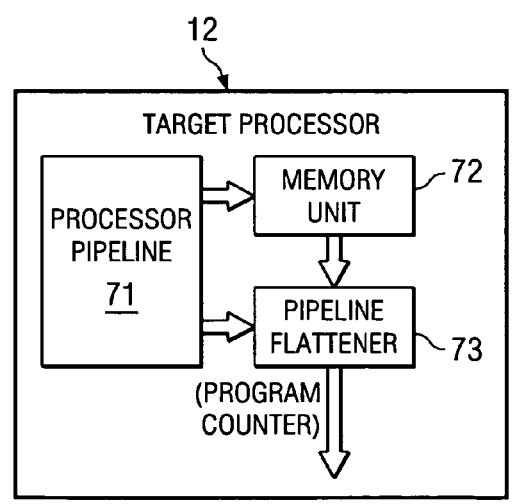
FIG. 7B is block diagram illustrating where the program counter identification of instructions is provided for the trace streams according to the present invention . . .

As indicated in FIG. 6A, the program counter trace stream includes the absolute address of the program counter for an instruction. Referring to FIG. 7B, each processor includes a processor pipeline 71. When the instruction leaves the processor pipeline, the instruction is entered in the pipeline flattener 73. At the same time, an access of memory unit 72 is performed. The results of the memory access of memory unit 72, which may take several clock cycles, is then merged the associated instruction in the pipeline flattener 73 and withdrawn from the pipeline flattener 73 for appropriate distribution. The pipeline flattener 73 provides a technique for maintaining the order of instructions while providing for the delay of a memory access. In the preferred embodiment, the absolute address used in the program counter trace stream is the derived from the instruction of leaving the pipeline flattener 71. As a practical matter, the absolute address is delayed. It is not necessary to use a pipeline flattener 73. The instructions can have appropriate labels associated therewith to eliminate the need for the pipeline flattener 73.

Figure 8A:
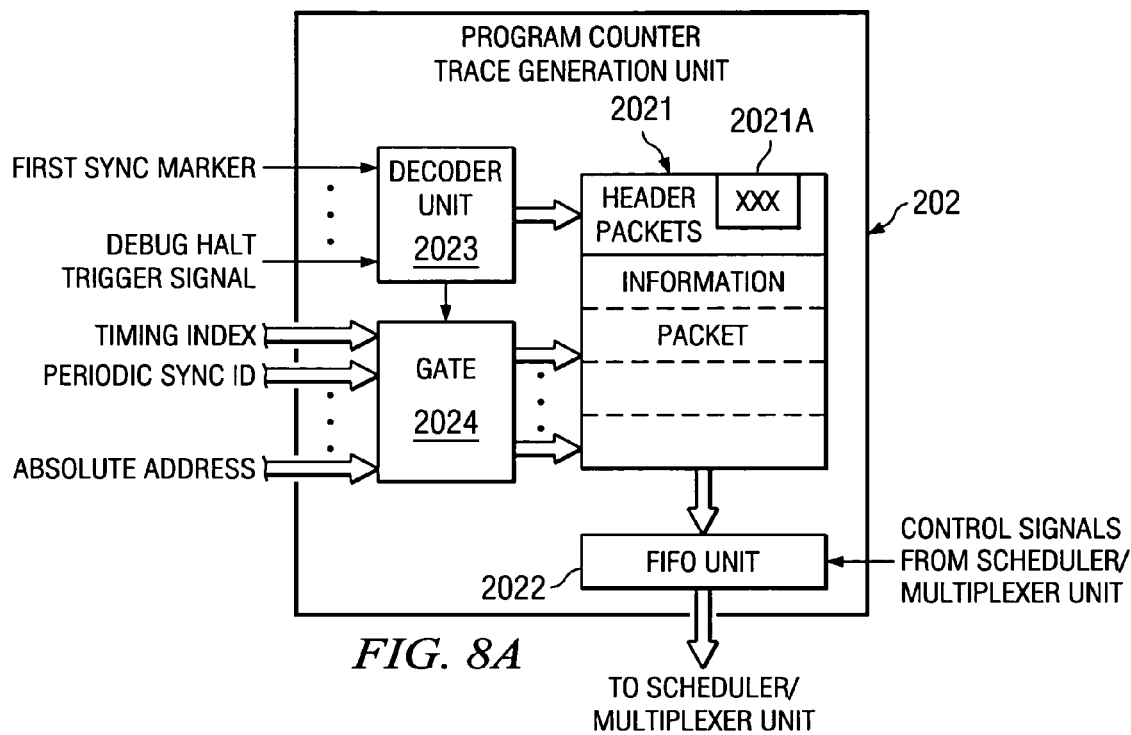
FIG. 8A is block diagram of the program counter sync marker generator unit.

Referring to FIG. 8A, the major components of the program counter packet generation unit 202 is shown. The program counter packet generation unit 202 includes a decoder unit 2023, storage unit 2021, a FIFO unit 2022, and a gate unit 2024. PERIODIC SYNC ID signals, TIMING INDEX signals, and ABSOLUTE ADDRESS signals are applied to gate unit 2024. When the PERIODIC SYNC ID signals are incremented, the decoder unit 2023, in response to the PERIODIC SYN ID signal, stores a periodic sync ID header signal group in a predetermined location 2021A of the header portion of the storage unit 2021. The PERIODIC SYNC signal causes the gate 2024 to transmit the PERIODIC SYNC ID signals, the TIMING INDEX signals and the ABSOLUTE ADDRESS signals. These transmitted signals are stored in the storage unit 2021 in information packet locations assigned to these parameters. When all of the portions of the periodic sync marker have been assembled in the storage unit 2021, then the component packets of the periodic sync marker are transferred to the FIFO unit 2022 for eventual transmission to the scheduler/multiplexer unit. Similarly, when a DEBUG HALT signal is generated and applied to the decoder unit 2023, the debug halt header identifying signal group is stored in position 2021A in the header portion of the storage unit 2021. The DEBUG HALT signal applied to decoder unit 2023 results in a control signal being applied to the gate 2024. As a result of the control signal, the SYNC ID signals, the TIMING INDEX signals, and the ABSOLUTE ADDRESS signals are stored in the appropriate locations in storage unit 2021. When the debug halt signal sync marker has been assembled, i.e., in packets, the debug sync marker is transferred to the FIFO unit 2022.

Figure 8B:
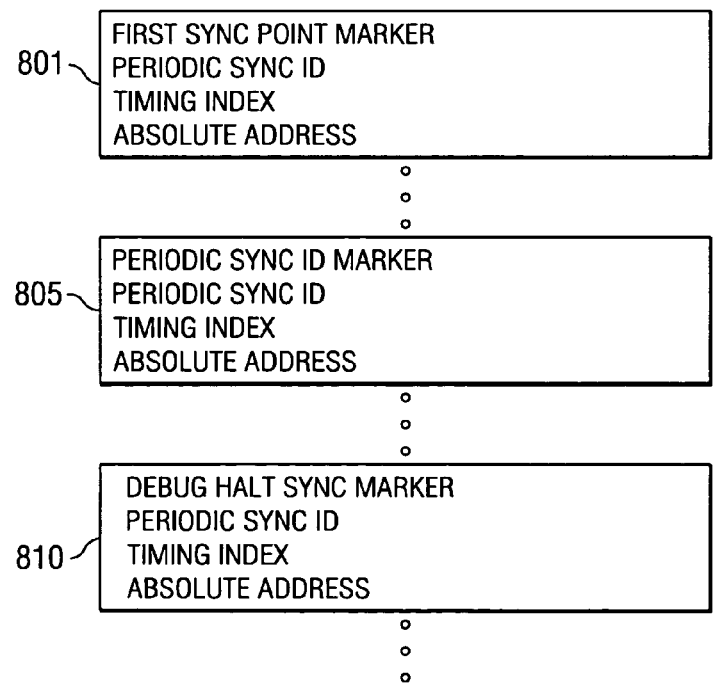
FIG. 8B illustrates the sync markers generated in the presence of a debug halt condition.

Referring to FIG. 8B, examples of the sync markers in the program counter trace stream are shown. The start of the test procedure is shown in first point sync marker 801. Thereafter, periodic sync ID markers 805 can be generated. Other event markers can also be generated. The identification of a DEBUG HALT signal results in the generation of a debug sync marker 810.

Figure 8C:
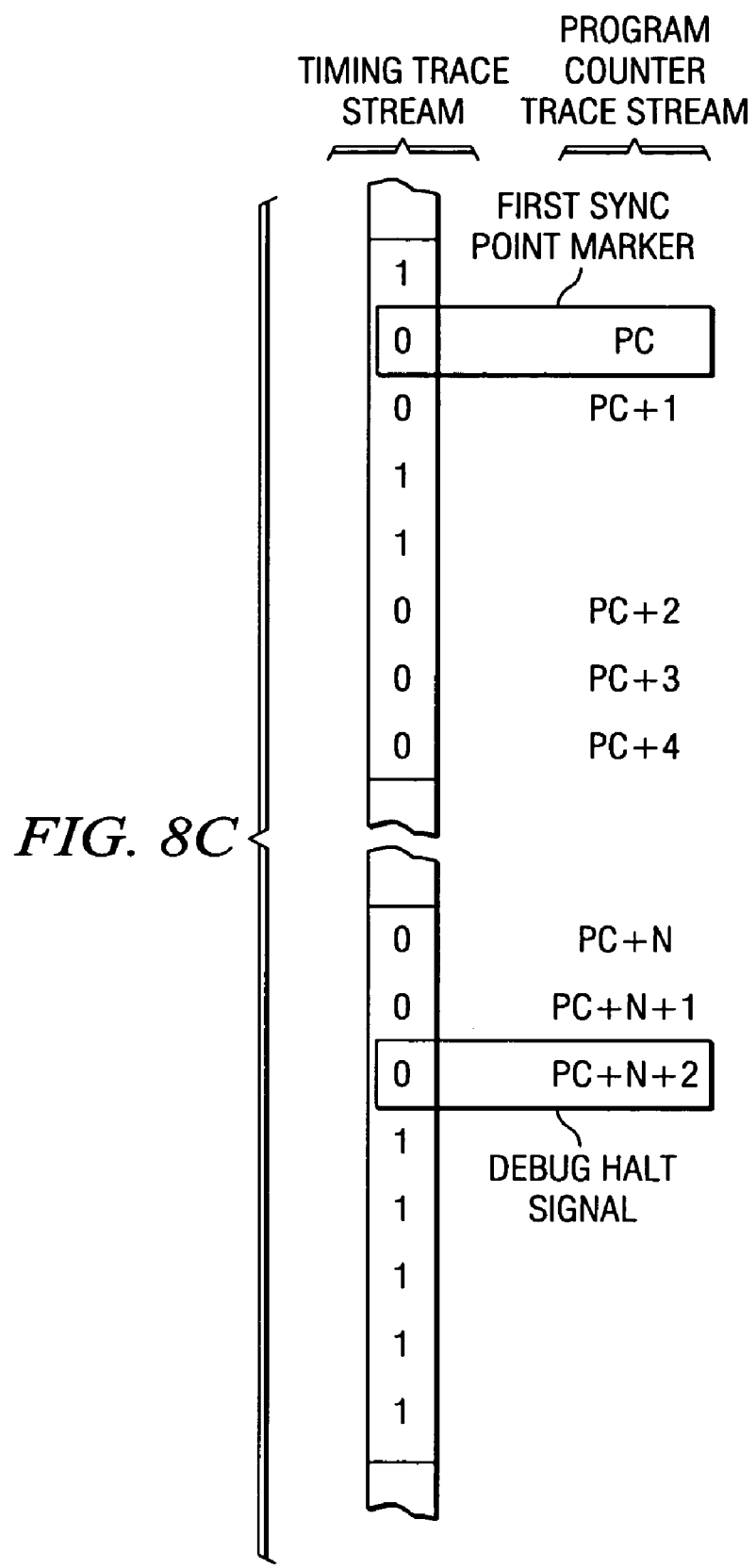
FIG. 8C illustrates the reconstruction of the processor operation from the trace stream according to the present invention.

Referring to FIG. 8C, the reconstruction of the program counter trace stream from the sync markers of FIG. 8B and the timing trace stream is shown. The first sync point marker indicates the beginning of test procedure with a program counter address of PC. The program continues to execute unit with the program counter addresses being related to a particular processor clock cycle. When the DEBUG HALT signal is generated, the program counter is at address PC+N+2 and is related to a particular clock cycle. Thereafter, the program counter does not advance as indicated by the logic "1"s associated with each clock cycle.

2. Operation of the Preferred Embodiment

The present invention relies on the ability to relate the timing trace stream and the program counter trace stream. This relationship is provided by having periodic sync ID information transmitted in each trace stream. In addition, the timing packets are grouped in packets of eight signals identifying whether the program counter or the pipeline advanced or didn't advance. The sync markers in the program counter stream include both the periodic sync ID information and the position in the current eight position packet when the event occurred. Thus, the clock cycle of the event can be specified. In addition, the address of the program counter is provided in the program counter sync markers so that the event can be related to the execution of the program. As a result, when a debug halt sync marker is generated, the location of the signal relative to the target processor clock and to the target processor program execution is established and can be reconstructed by the target processor. In the preferred embodiment, data (memory access) information is transferred from the target processor to the host processing unit. It is therefore possible to reconstruct the entire operation of the target processor from the transmitted trace streams.

The sync marker trace steams illustrated above relate to an idealized operation of the target processor in order to emphasize the features of the present invention. Numerous other processor events (e.g. branch events) will typically be entered in the storage unit and included in the program counter trace stream.

In the foregoing discussion, the sync markers can have additional information embedded therein depending on the implementation of the apparatus generating and interpreting the trace streams. This information will be related to the parameters shown in FIG. 5. It will also be clear that a data trace stream, as shown in FIG. 2 will typically be present. The periodic sync IDs as well as the timing indexes will also be included in the data trace stream. In addition, the program counter absolute address parameter can be replaced by the program counter off-set register in certain situations.

One or more events in the target processor can be used to specify the generation of a DEBUG HALT signal. Signals representing these events are applied to the trigger unit. The trigger unit includes the decision making capability to determine when a DEBUG HALT signal should be generated. The DEBUG HALT signal and associated control signals not only result in the generation of the debug halt sync marker, cause the target processor to transition to the appropriate state.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. During the testing of the operation of processing unit, a system for identifying the occurrence of a processor unit debug halt condition, the system comprising:
   timing trace apparatus responsive to signals from the processor unit, the timing trace apparatus generating a timing trace stream;
   program counter trace apparatus responsive to signals from the processing unit, the program counter trace apparatus generating a program counter trace stream; and
   synchronization apparatus applying periodic signals to the timing trace apparatus and to the program counter trace apparatus, the periodic signals providing a synchronization between trace streams;
   wherein the program counter trace apparatus is responsive to a debug halt signal, the program counter trace apparatus generating marker signal group identifying the occurrence of the debug halt signal and relating the debug halt signal to the timing trace stream.

2. The system as recited in claim 1 wherein the marker signal group includes a program counter address, a timing index and a periodic sync ID.

3. The system as recited in claim 1 further comprising:
   data trace apparatus responsive to signals from the processing unit, the data trace apparatus generating a data trace stream, wherein the periodic signals are applied to the data trace apparatus; and
   a host processing unit, the host processing unit responsive to the timing trace stream, the program counter trace stream and the data trace stream, the host processing unit reconstruction the processing activity of the processing unit from the trace streams.

4. The method for communicating an occurrence of a debug halt signal from a target processor unit to a host processing unit, the method comprising:
   generating a timing trace stream, a program counter trace stream, and data trace stream, and
   in the program counter trace stream, including a marker signal group indicating an occurrence of debug halt signal and relating the occurrence of the debug halt signal to the data trace stream and to the timing trace stream.

5. The method as recited in claim 4 further comprising:
   in the marker signal group, including a periodic sync ID, a timing index and a program counter address.

6. In a processing unit test environment wherein a target processor transmits a plurality of trace streams to a host processing unit, a marker signal group included in a trace signal stream, the marker signal group comprising:
   indicia of the occurrence of a debug halt signal;
   indicia of the relationship of the occurrence of the debug halt signal to the target processor clock; and
   indicia of the relationship of the occurrence of the debug halt signal to the target processor program execution.

7. In a target processing unit generating trace test signals for transfer to a host processing unit, program counter trace generation apparatus comprising:
   a storage unit;
   a decoder unit responsive to a reset signal for storing a signal group identifying the debug halt signal in the storage unit in a first location in the storage unit, the decoder unit generating a control signal;
   a gate unit responsive to the control signal, the gate unit transmitting processor signals applied thereto to the storage unit for storage at defined locations, the signals stored in the storage unit forming a debug halt sync marker; and
   a FIFO unit coupled to the storage unit, the FIFO unit receiving the debug halt sync marker when the debug halt sync marker is complete, the FIFO unit transferring the debug halt sync marker to the host processing unit.

8. The program counter trace apparatus as recited in claim 7 wherein the debug halt sync marker signal includes a plurality of packets.

9. The program counter trace apparatus as recited in claim 7 wherein the processor signals applied to the gate unit include a program counter address, a periodic sync ID, and a timing index.

* * * * *